US008415571B2

(12) United States Patent
Kiely et al.

(10) Patent No.: US 8,415,571 B2
(45) Date of Patent: Apr. 9, 2013

(54) SLOTTED RETAINER RING FOR SNAP-IN ELECTRICAL CONNECTOR

(75) Inventors: Kenneth M. Kiely, Milford, CT (US); Delbert L. Auray, Southport, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 240 days.

(21) Appl. No.: 13/034,635

(22) Filed: Feb. 24, 2011

(65) Prior Publication Data

US 2011/0250776 A1 Oct. 13, 2011

Related U.S. Application Data

(60) Provisional application No. 61/307,626, filed on Feb. 24, 2010.

(51) Int. Cl.
*H02G 3/06* (2006.01)

(52) U.S. Cl.
USPC .......... 174/669

(58) Field of Classification Search .......... 174/668, 174/669, 666, 665
See application file for complete search history.

(56) References Cited

U.S. PATENT DOCUMENTS

| | | | | | |
|---|---|---|---|---|---|
| 3,193,613 | A * | 7/1965 | Buren, Jr. | ........ | 174/669 |
| 5,171,164 | A * | 12/1992 | O'Neil et al. | ........ | 439/552 |
| 5,373,106 | A * | 12/1994 | O'Neil et al. | ........ | 174/669 |
| 6,709,280 | B1 * | 3/2004 | Gretz | ........ | 439/92 |
| 6,780,029 | B1 * | 8/2004 | Gretz | ........ | 439/92 |
| 6,860,758 | B1 * | 3/2005 | Kiely | ........ | 439/557 |
| 6,957,968 | B1 * | 10/2005 | Gretz | ........ | 439/92 |
| 7,064,273 | B1 * | 6/2006 | Kiely | ........ | 174/666 |
| 7,703,813 | B1 * | 4/2010 | Kiely | ........ | 285/139.1 |
| 8,162,693 | B2 * | 4/2012 | Auray et al. | ........ | 439/557 |

* cited by examiner

*Primary Examiner* — Neil Abrams
(74) *Attorney, Agent, or Firm* — Briggs and Morgan, P.A.

(57) ABSTRACT

A connector assembly having a slot aperture retainer ring for securing a connector body to an electrical box, with a slot adapted to receive a common tool, such as a screwdriver, to facilitate removal of the retainer ring from inside the electrical box. In one embodiment, the slot of the retainer ring is aligned generally perpendicular to a center axis of the retainer ring. One or more inwardly bent preload fingers or tabs engage an outer surface of the connector body upon assembly. A connector assembly utilizing a shoulder structure to capture a wall portion of an electrical box is described wherein the wall portion is held between the shoulder structure and a stop flange with the shoulder structure resisting removal of the connector assembly from the electrical box.

27 Claims, 5 Drawing Sheets

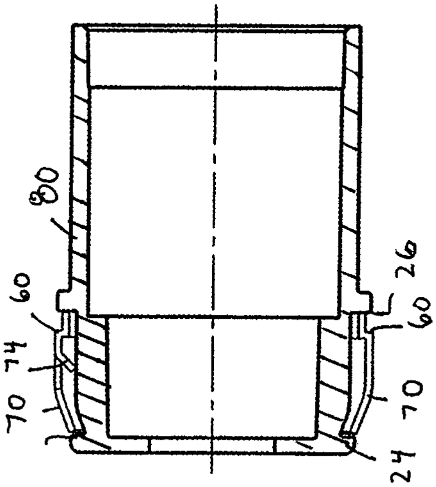
FIG. 8
FIG. 7
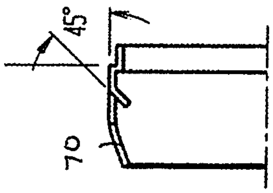
FIG. 9
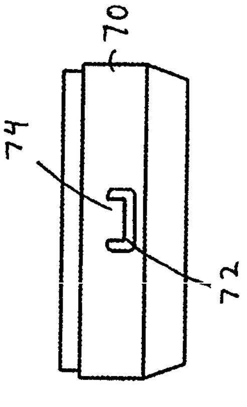
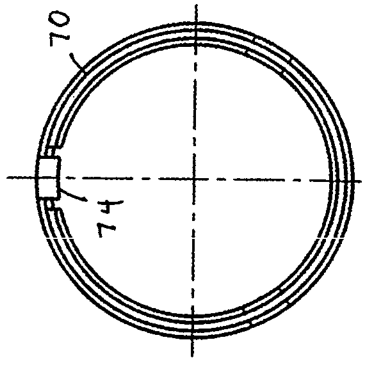
FIG. 10

SLOTTED RETAINER RING FOR SNAP-IN ELECTRICAL CONNECTOR

RELATED APPLICATION

This application claims the benefit of U.S. Provisional Application No. 61/307,626 filed Feb. 24, 2010, and incorporated herein by reference.

TECHNICAL FIELD

The invention is directed to a further advancement in the field of electrical connector assemblies. More specifically, this application relates to a slotted outer retainer ring for a snap-fit electrical connector assembly and having a construction for facilitating efficient connection and disconnection of the connector assembly to an electrical box.

BACKGROUND OF THE INVENTION

Electrical connectors are commonly used for attaching electrical conductors, cables, wires, electrical metal tubing (EMT) or the like to an electric box, e.g. a junction box, outlet box, switch box, fuse box, or other similar type of electric box. Such known electrical connectors are either of a type that are secured to an electric box by a threaded locknut or by means of a circular snap fit retainer ring of the type disclosed in U.S. Pat. Nos. 6,860,758; 6,444,907; 5,189,258; 5,266,050; and 5,171,164, for example.

So called "snap fit" connectors have been in use for some time, including connectors disclosed in Applicant's U.S. Pat. Nos. 7,064,272; 7,075,007; 7,205,489 and 7,214,890. Such connectors have typically been coupled to the junction box by forcibly inserting one end of the connector into the knock-out hole of a junction box. Such connectors include a circular retainer ring which is deformed during insertion of the connector body into a knock-out hole. In the past, a generally linear motion has been used to insert the connector end into the junction box. Using such a straight motion, the connector end is pushed into the knock-out hole so as to deform a retainer ring as it passes through the knock-out hole.

A significant limitation of some prior art connector assemblies is the difficulty in removing or repositioning the connector assembly once the outer retainer ring is inserted into an electrical box.

SUMMARY OF THE INVENTION

The present invention provides a connector assembly having a retainer ring for securing a connector body to an electrical box.

An embodiment of the present invention includes a slotted retainer ring having a slot adapted to receive a common tool, such as a screwdriver, to facilitate removal of the retainer ring from inside the electrical box. In one embodiment, the slot of the retainer ring is aligned generally perpendicular to a center axis of the retainer ring.

In one embodiment one or more inwardly bent preload fingers or tabs engage an outer surface of the connector body upon assembly. These fingers collapse inwardly as the retainer ring is inserted into the electrical box and spring outwardly once the tabs have passed through the box wall. These fingers function to bias the ring into engagement with the perimeter of the electrical box and provide some degree of improved electrical continuity.

An embodiment of the present invention includes a slit ring retainer having an overlap design to provide alignment and prevent tangling of the rings prior to assembly. The slot may be positioned near one end of the split ring to minimize forces needed to remove the ring from the connector body.

An object of the present invention is the provision of an outer retainer ring having a shoulder structure at its trailing end adapted to engage the perimeter of the knock-out hole of the electrical box. The shoulder structure provides a degree of pull-out resistance for the connector assembly.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 7 is a top plan view of a second embodiment of a retainer ring.

FIG. 8 is a cross sectional view of a second embodiment of a connector assembly using the retainer ring of FIG. 7.

FIG. 9 is a detailed portion of the cross sectional view of FIG. 8.

FIG. 10 is a side elevational view of the retainer ring of FIG. 7.

DETAILED DESCRIPTION OF THE INVENTION

Figure 1:
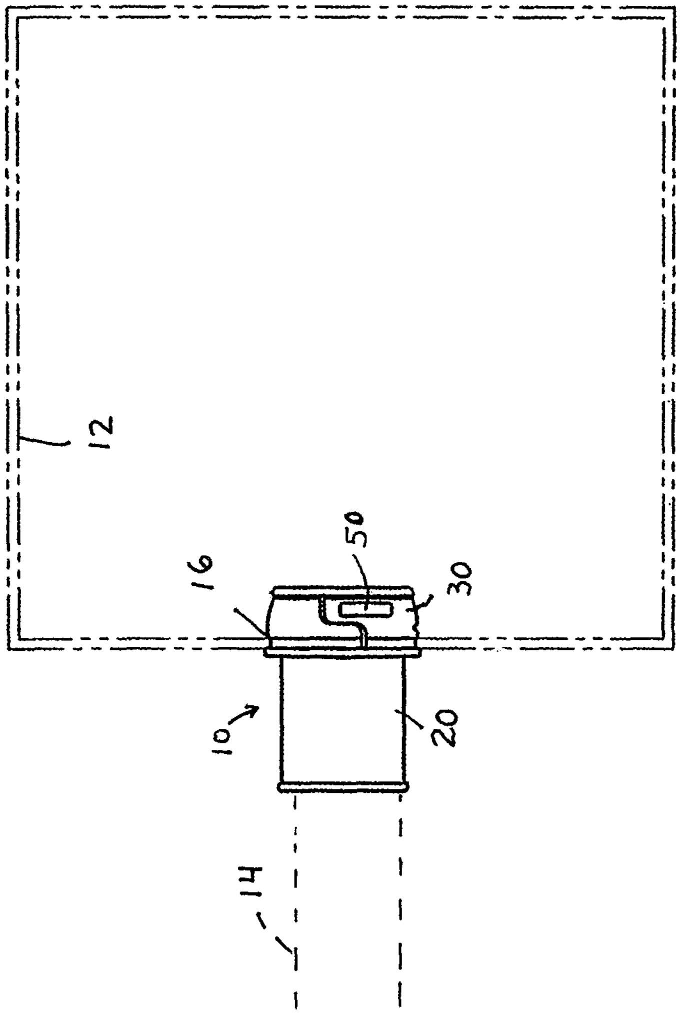
FIG. 1 illustrates an electrical connector assembly in accordance with the present invention depicted as being attached to an electrical junction box.

Referring to the drawings, FIG. 1 illustrates an embodiment of an electrical connector assembly 10 in accordance with the present invention. FIG. 1 depicts connector assembly 10 in an assembled state relative to a junction box 12 and electric wire 14. As used herein, wire 14 includes a variety of conduits and cables. As described hereinafter, connector assembly 10 is used to couple electrical wire 14 at knock-out hole 16 of junction box 12. Connector assembly 10 includes connector body 20 and an outer retainer ring 30.

Connector body 20 is preferably formed of metallic or non-metallic material. For example, connector body 20 may be made of zinc or other suitable metallic alloys or a non-metallic plastic or resin material.

Figure 2:
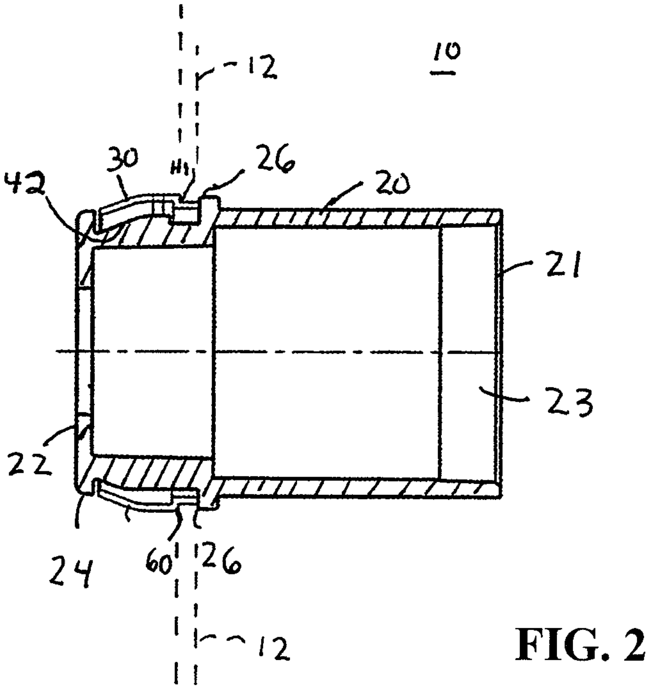
FIG. 2 illustrates a cross sectional view of the electrical connector assembly of FIG. 1.

FIG. 2 illustrates a cross-sectional view of the connector assembly of FIG. 1. Connector body 20 is formed with an inlet end portion 21 and an outlet end portion 22 and a bore 23 extending therethrough. A lip 24 is formed at outlet end portion 22.

Intermediate the connector body 20, in the illustrated embodiment between the inlet end portion 21 and outlet end portion 22, there is provided radially outwardly extending flange 26 which functions as a stop to limit the degree to which connector body 20 may be inserted through the knock-out hole 16 of junction box 12. In the illustrated embodiment, stop flange 26 is unbroken, while in alternative embodiments stop flange 26 may comprise disjointed or separated elements encircling connector body 20 and together functioning to limit the degree to which connector body 20 may be inserted into a junction box 12.

Figure 3:
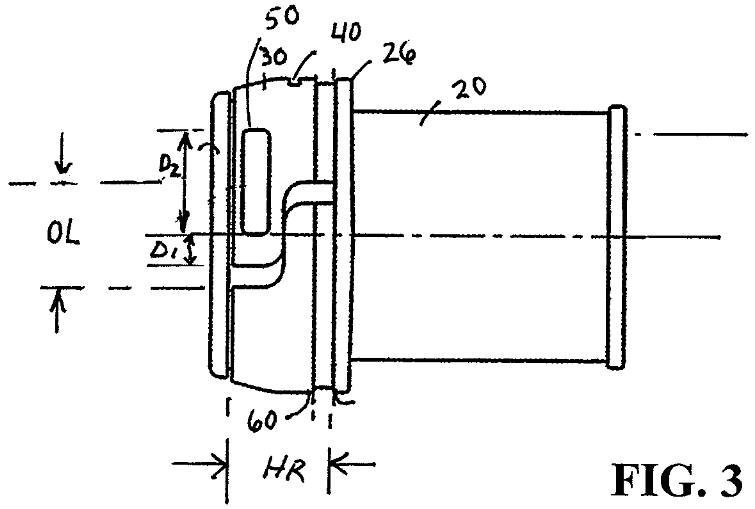
FIG. 3 is a top plan view of the electrical connector assembly of FIG. 1.

FIG. 3 is a top plan view of the connector assembly 10. Retainer ring 30 is generally cylindrical or frusto-conical in form and is adapted in size to be received onto the outlet end portion 22. Ends of retainer ring 30 are overlapped a dimension, OL. In the illustrated embodiment, dimension OL is approximately equal to a height dimension, HR, of the retainer ring 30.

Retainer ring 30 is preferably split and includes a slot opening 50. Slot opening 50 is adapted to receive a tool, such as a blade of a screwdriver. Slot 50 is preferably located near one end of the split retainer ring 30. Slot 50 is adapted to receive a common tool, such as a screwdriver, to facilitate removal of the retainer ring 30 from inside the electrical box. In the illustrated embodiment, the slot 50 is aligned generally perpendicular to a center axis of the retainer ring 30. Slot 50 is preferably positioned closer to the outlet end portion 22 of the connector body than the stop flange 26. Slot 50 is preferably positioned a distance, D1 (shown in FIG. 3), from an end of retainer ring 30 which is less than a slot length, D2. A portion of slot 50 is positioned within the overlapped portion, OL. In a preferred embodiment, approximately 50% of the slot 50 is positioned within the overlapped portion, OL, of ring retainer 30.

Retainer ring 30 includes a plurality of inwardly directed finger-like extensions or tabs 40. Tabs 40 are inwardly bent and are sized to operatively engage an outer surface 42 of the connector body 20. Tabs 40 are shown as generally unbent along their lengths. In alternative embodiments, the tabs 40 may be bent, curved, or otherwise deformed along the length of tab 40. Tabs 40 collapse inwardly as the retainer ring 30 is inserted into the electrical box and spring outwardly once the tabs 40 have passed through the box wall. These tabs 40 function to bias the ring 30 into engagement with the perimeter of the electrical box and provide some degree of improved electrical continuity.

Retainer ring 30 is held on the outlet end portion 22 of the connector body between lip 24 and stop flange 26. As described herein, the retainer ring 30 may be released from the connector body using a tool such as a screwdriver. Retainer ring 30 is preferably of a spring-type steel.

Retainer ring 30 includes a shoulder structure 60 at its trailing end adapted to engage the perimeter of the knock-out hole of the electrical box. Shoulder structure 60 is defined by a height, H1. In the preferred embodiment height, H1, is approximately equal to a thickness of the retainer ring 30. Shoulder structure 60 is illustrated to encircle the perimeter of the retainer ring. In alternative embodiments shoulder structure 60 may extend around only a portion of the outer perimeter of the retainer ring 30 and may comprise separated sections rather than a continuous shoulder as illustrated. The shoulder structure 60 provides a degree of pull-out resistance for the connector assembly. Upon installation, the wall of the electrical box is held between the forward edge of the shoulder structure 60 and stop flange 26.

Figure 4:
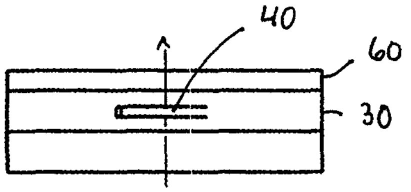
FIG. 4 is a top view of the retainer ring 30 of FIG. 1.
Figure 5:
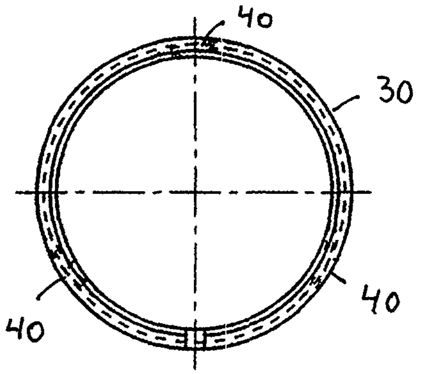
FIG. 5 is a side elevational view of the retainer ring 30 of FIG. 1.

FIG. 4 is a top plan view of the retainer ring 30 showing the position of the tab 40. FIG. 5 is a side view of the retainer ring 30 showing the position of the tabs 40, which are generally spaced 120 degrees apart around the circumference of the retainer ring 30.

During assembly of connector assembly 10, the retainer ring 30 is deformed and seated between stop flange 26 and front lip 24. Tabs 40 function to center the retainer ring 30 around the outlet end portion 22 of connector body 20.

During installation of the connector assembly 10, the retainer ring 30 and outlet end portion 22 are inserted into a hole of the electrical box. The retainer ring 30 is slightly deformed upon insertion into the hole. Once the enlarged portion of the retainer ring 30 passes into the electrical box, the flange structure is biased into engagement with the wall of the electrical box. As a result, the electrical box wall is held between the stop flange 26 of the connector body 20 and the shoulder structure 60 on the retainer ring 30. Shoulder structure 60 is defined by a relatively abrupt transition in the wall of the retainer ring 30.

Figure 6:
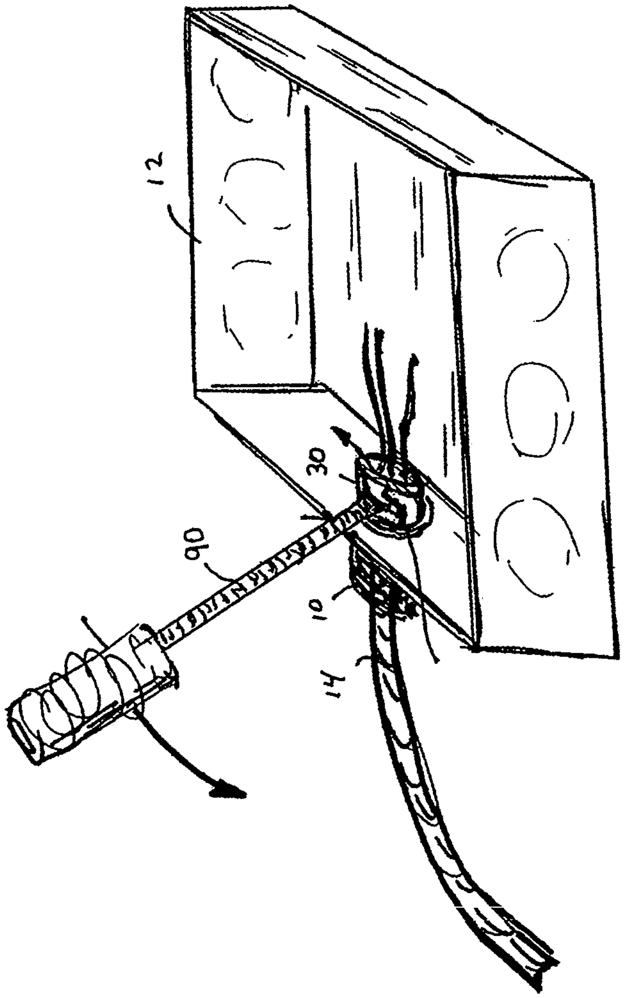
FIG. 6 depicts a procedure for removing the connector assembly of FIG. 1 from an electrical box.

FIG. 6 depicts a process of removing retainer ring 30 from the connector assembly 10. A blade of screwdriver 90 is engaged into slot 50 and when screwdriver 90 is twisted or tilted against the electrical box wall, the retainer ring 30 is deformed and is released from capture by connector body 20. With retainer ring 30 so released, the connector body 20 can be withdrawn from the electrical box.

FIG. 7 illustrates a second embodiment of a retainer ring 70 for use with connector assembly 80 as shown in FIG. 8. In this embodiment, ring 70 is not split and includes a c-shaped slot 72. Slot 72 is defined by a combination cut and bend process whereby a tab portion 74 of the ring 70 is bent inwardly. Similar to the tabs 40 of the embodiment of FIG. 1, tab portion 74 is slightly deformed when the retainer ring is passed through a hole of the electrical box and somewhat returns to form once the ring 70 is fully seated. FIG. 9 is a detailed portion of the cross sectional view of FIG. 8. FIG. 10 is a side view of the retainer ring 70.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An electrical connector assembly for securing an electrical conductor to an electrical box or the like comprising:

a connector body having an inlet end portion and an outlet end portion; and a retainer ring secured upon said outlet end portion with said retainer ring defining a slot adapted to receive a flat edged tool, with said slot being positioned on the retainer ring to be closer to the outlet end portion of the connector body than a stop flange, and with said slot allowing at least a portion of the flat edged tool to be passed therethrough during a retainer ring removal process.

2. The electrical connector assembly of claim 1 wherein the slot is generally perpendicular to a center axis of the connector assembly.

3. The electrical connector assembly of claim 2 wherein the slot is sized to receive a flat screwdriver blade.

4. The electrical connector assembly of claim 1 wherein the retainer ring is split.

5. The electrical connector assembly of claim 4 wherein the slot is located near one end of the split retainer ring.

6. The electrical connector assembly of claim 5 wherein the slot is located a distance, D1, from the one end of the split retainer ring which is less than a slot length, D2.

7. The electrical connector assembly of claim 4 wherein ends of the retainer ring are overlapped.

8. The electrical connector assembly of claim 7 wherein the slot is located at least partially within an overlapped end portion of the split retainer ring.

9. The electrical connector assembly of claim 8 wherein approximately 50% of a length of the slot is located within the overlapped end portion.

10. The electrical connector assembly of claim 1 further comprising a plurality of inwardly directed fingers.

11. The electrical connector assembly of claim 10 wherein the plurality of fingers are generally perpendicular to an axis of the retainer ring.

12. The electrical connector assembly of claim 1 further comprising a shoulder structure, with a wall portion of the electrical box being captured between the shoulder structure and the stop flange upon installation.

13. The electrical connector assembly of claim 12 wherein the shoulder structure has a height which is approximately equal to a thickness of the retainer ring.

14. An electrical connector assembly for securing an electrical conductor to an electrical box or the like comprising:

a connector body having an inlet end portion and an outlet end portion;

a retainer ring secured upon said outlet end portion with said retainer ring defining a shoulder structure, with a wall portion of the electrical box being captured between the shoulder structure and a stop flange of the connector body upon installation, said shoulder structure tending to resist removal of the connector assembly from the electrical box; and a slot adapted to receive a flat edged tool, with said slot being positioned on the retainer ring to be closer to the outlet end portion of the connector body than the stop flange, and with said slot allowing at least a portion of the flat edged tool to inserted during a retainer ring removal process.

15. The electrical connector assembly of claim 14 wherein the shoulder structure is defined substantially around an outer perimeter of the retainer ring.

16. The electrical connector assembly of claim 15 wherein the shoulder structure has a height, H1, which is approximately equal to a thickness of the retainer ring.

17. The electrical connector assembly of claim 14 wherein the slot is generally perpendicular to a center axis of the connector assembly.

18. The electrical connector assembly of claim 17 wherein the retainer ring is split.

19. The electrical connector assembly of claim 18 wherein the slot is located near one end of the split retainer ring.

20. The electrical connector assembly of claim 19 wherein the slot is located a distance, D1, from the one end of the split retainer ring which is less than a slot length, D2.

21. The electrical connector assembly of claim 18 wherein ends of the retainer ring are overlapped.

22. The electrical connector assembly of claim 21 wherein the slot is located at least partially within an overlapped end portion of the split retainer ring.

23. The electrical connector assembly of claim 22 wherein approximately 50% of the slot is located within the overlapped end portion.

24. The electrical connector assembly of claim 14 further comprising a plurality of inwardly directed fingers.

25. The electrical connector assembly of claim 24 wherein the plurality of fingers are generally perpendicular to an axis of the retainer ring.

26. A method of using an electrical connector assembly for securing an electrical conductor to an electrical box comprising:

providing a connector body having an inlet end portion, and an outlet end portion, and a stop flange, with a retainer ring secured upon said outlet end portion and including at least one slot;

passing at least a portion of the outlet end portion of the connector body and the retainer ring through a hole of the electrical box, with said passing causing the retainer ring to deform;

releasing the retainer ring from its deformed state by further passing the outlet end portion of the connector body into the electrical box, with said releasing causing a shoulder structure of the retainer ring to engage near the hole of the electrical box;

preventing withdrawal of the connector body and the retainer ring by contact between the shoulder structure and the electrical box;

releasing the retainer ring from engagement with the connector body by inserting a tool into the slot and twisting or rotating the tool relative to the retainer ring; and withdrawing the connector body from the hole of the electrical box.

27. A method of removing an electrical connector assembly from an electrical box, with the connector assembly including a connector body having an inlet end portion and an outlet end portion, with a retainer ring secured upon the outlet end portion and including at least one slot, and with at least a portion of the outlet end portion of the connector body and the retainer ring being passed through a hole of the electrical box, said method comprising:

releasing the retainer ring from engagement with the connector body by inserting a tool into the slot and twisting or rotating the tool relative to the retainer ring; and withdrawing the connector body from the hole of the electrical box.

* * * * *